(12) United States Patent
Dorfner et al.

(10) Patent No.: US 9,104,562 B2
(45) Date of Patent: Aug. 11, 2015

(54) ENABLING COMMUNICATION OVER CROSS-COUPLED LINKS BETWEEN INDEPENDENTLY MANAGED COMPUTE AND STORAGE NETWORKS

(71) Applicant: International Business Machines Corporation, Armonk, NY (US)

(72) Inventors: John Dorfner, Rhinebeck, NY (US); Casandra H. Qiu, Hopewell Junction, NY (US); Aruna V. Ramanan, Poughkeepsie, NY (US); Alison B. White, Kingston, NY (US)

(73) Assignee: International Business Machines Corporation, Armonk, NY (US)

( * ) Notice: Subject to any disclaimer, the term of this patent is extended or adjusted under 35 U.S.C. 154(b) by 306 days.

(21) Appl. No.: 13/857,313

(22) Filed: Apr. 5, 2013

(65) Prior Publication Data

US 2014/0304554 A1    Oct. 9, 2014

(51) Int. Cl.
  *G06F 11/07*    (2006.01)
(52) U.S. Cl.
  CPC ................... *G06F 11/0727* (2013.01)
(58) Field of Classification Search
  CPC .................................................. G06F 11/0727
  USPC .......................................................... 714/43
  See application file for complete search history.

(56) References Cited

U.S. PATENT DOCUMENTS

| | | | |
|---|---|---|---|
| 7,197,536 | B2 | 3/2007 | Beukema et al. |
| 7,673,009 | B2 | 3/2010 | Fein et al. |
| 7,822,889 | B2 | 10/2010 | Arimilli et al. |
| 7,904,590 | B2 | 3/2011 | Arimilli et al. |

(Continued)

FOREIGN PATENT DOCUMENTS

WO    2012058295 A1    5/2012

OTHER PUBLICATIONS

Dongfeng et al., "CFS: the Design and Implementation of a Cluster File System Service on Inspur AS3000", 2011 International Conference on Computational and Information Sciences, 2011. pp. 847-849.

(Continued)

*Primary Examiner* — Bryce Bonzo
*Assistant Examiner* — India Davis
(74) *Attorney, Agent, or Firm* — Cantor Colburn LLP; Steven Chiu

(57) ABSTRACT

Embodiments relate to providing communication over cross-coupled links between independently managed compute and storage networks. An aspect includes coupling an independently managed local subsystem with an independently managed remote subsystem over cross-coupled links, whereby each subsystem includes compute entities and storage entities. Unique identifiers are assigned to all the compute entities and the storage entities in the local network and the remote network. A determination is then made as to whether each entity is in the local subsystem or the remote subsystem. Accordingly, a global broadcast tree is built to bridge the compute entities in the local subsystem to the storage entities in both the local and remote subsystem. Responsive to an error in a layer of the local subsystem external to a cross-coupled link, the cross-coupled link in the local subsystem is disabled. Accordingly, the remote subsystem may detect that the link has failed.

18 Claims, 11 Drawing Sheets

(56) References Cited

U.S. PATENT DOCUMENTS

| | | |
|---|---|---|
| 8,443,237 B2 * | 5/2013 | Konishi et al. .................. 714/43 |
| 2003/0115447 A1 | 6/2003 | Pham et al. |
| 2008/0077635 A1 | 3/2008 | Sporny et al. |
| 2008/0225860 A1 * | 9/2008 | Manion et al. ........... 370/395.31 |
| 2009/0213755 A1 | 8/2009 | Lu |
| 2012/0158923 A1 | 6/2012 | Mohamed et al. |
| 2012/0209984 A1 | 8/2012 | Gonzalez-Banos et al. |

OTHER PUBLICATIONS

D. Levin, "Implementation Details of a Scalable, QoS-Constrained Overlay Network", Department of Computer Science, Boston University Boston, MA 02215, Spring 2004. 9 pages.

Van Hensbergen et al., "Revisiting Link-Layer Storage Networking", Technical Report RC22609, IBM Research Division, Oct. 23, 2002. pp. 1-105.

\* cited by examiner

ENABLING COMMUNICATION OVER
CROSS-COUPLED LINKS BETWEEN
INDEPENDENTLY MANAGED COMPUTE
AND STORAGE NETWORKS

GOVERNMENT CONTRACT

This invention was made with the United States Government support under Agreement No. HR0011-07-9-0002 awarded by the Defense Advanced Research Projects Agency (DARPA). The Government has certain rights in the invention.

BACKGROUND

The present invention relates generally to coupled supercomputers, and more specifically, to providing reliable communication over cross-coupled links between independently managed compute and storage networks.

Supercomputers, also known as high performance computers, typically include compute resources and storage devices connected to each other through an interconnection network. The network generally includes a set of routers or switches connected to clients through an appropriate network interface on the clients or nodes. A management subsystem of these systems generally has a complete view of all the entities in the system. Typically, the storage devices are shared between multiple systems. This sharing is made possible through server nodes attached to the storage devices that communicate with compute client nodes spread across multiple systems over an independent network. The access to storage devices across multiple systems is typically provisioned using a separate shared storage fabric that is independently managed.

SUMMARY

According to an embodiment of the present invention, a method for providing communication over cross-coupled links between independently managed compute and storage networks. An aspect includes coupling an independently managed local subsystem with an independently managed remote subsystem over cross-coupled links is provided. The method includes coupling an independently managed local subsystem with an independently managed remote subsystem over cross-coupled links, whereby each subsystem includes compute entities and storage entities. Unique identifiers are assigned to all the compute entities and the storage entities in the local network and the remote network. A determination is then made as to whether each entity is in the local subsystem or the remote subsystem. Accordingly, a global broadcast tree is built to bridge the compute entities in the local subsystem to the storage entities in both the local and remote subsystem. Responsive to an error in a layer of the local subsystem external to a cross-coupled link, the cross-coupled link in the local subsystem is disabled. Accordingly, the remote subsystem may detect that the link has failed.

According to another embodiment of the present invention, a system for providing communication over cross-coupled links between independently managed compute and storage networks. An aspect includes coupling an independently managed local subsystem with an independently managed remote subsystem over cross-coupled links is provided. The system includes a computer processor and logic executable by the computer processor. The logic is configured to implement a method. The method includes coupling an independently managed local subsystem with an independently managed remote subsystem over cross-coupled links, whereby each subsystem includes compute entities and storage entities. Unique identifiers are assigned to all the compute entities and the storage entities in the local network and the remote network. A determination is then made as to whether each entity is in the local subsystem or the remote subsystem. Accordingly, a global broadcast tree is built to bridge the compute entities in the local subsystem to the storage entities in both the local and remote subsystem. Responsive to an error in a layer of the local subsystem external to a cross-coupled link, the cross-coupled link in the local subsystem is disabled. Accordingly, the remote subsystem may detect that the link has failed.

According to a further embodiment of the present invention, a computer program product for providing communication over cross-coupled links between independently managed compute and storage networks. An aspect includes coupling an independently managed local subsystem with an independently managed remote subsystem over cross-coupled links is provided. The computer program product includes a storage medium having computer-readable program code embodied thereon, which when executed by a computer processor, causes the computer processor to implement a method. The method includes coupling an independently managed local subsystem with an independently managed remote subsystem over cross-coupled links, whereby each subsystem includes compute entities and storage entities. Unique identifiers are assigned to all the compute entities and the storage entities in the local network and the remote network. A determination is then made as to whether each entity is in the local subsystem or the remote subsystem. Accordingly, a global broadcast tree is built to bridge the compute entities in the local subsystem to the storage entities in both the local and remote subsystem. Responsive to an error in a layer of the local subsystem external to a cross-coupled link, the cross-coupled link in the local subsystem is disabled. Accordingly, the remote subsystem may detect that the link has failed.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments disclosed herein are directed to providing communication over cross-coupled links between independently managed compute and storage networks. An aspect of embodiments includes coupling an independently managed local subsystem with an independently managed remote subsystem over cross-coupled links, whereby each subsystem includes compute entities and storage entities. Unique identifiers are assigned to all the compute entities and the storage entities in the local network and the remote network. A determination is then made as to whether each entity is in the local subsystem or the remote subsystem. Accordingly, a global broadcast tree is built to bridge the compute entities in the local subsystem to the storage entities in both the local and remote subsystem. Responsive to an error in a layer of the local subsystem external to a cross-coupled link, the cross-coupled link in the local subsystem is disabled. Accordingly, the remote subsystem may detect that the link has failed.

Figure 1:
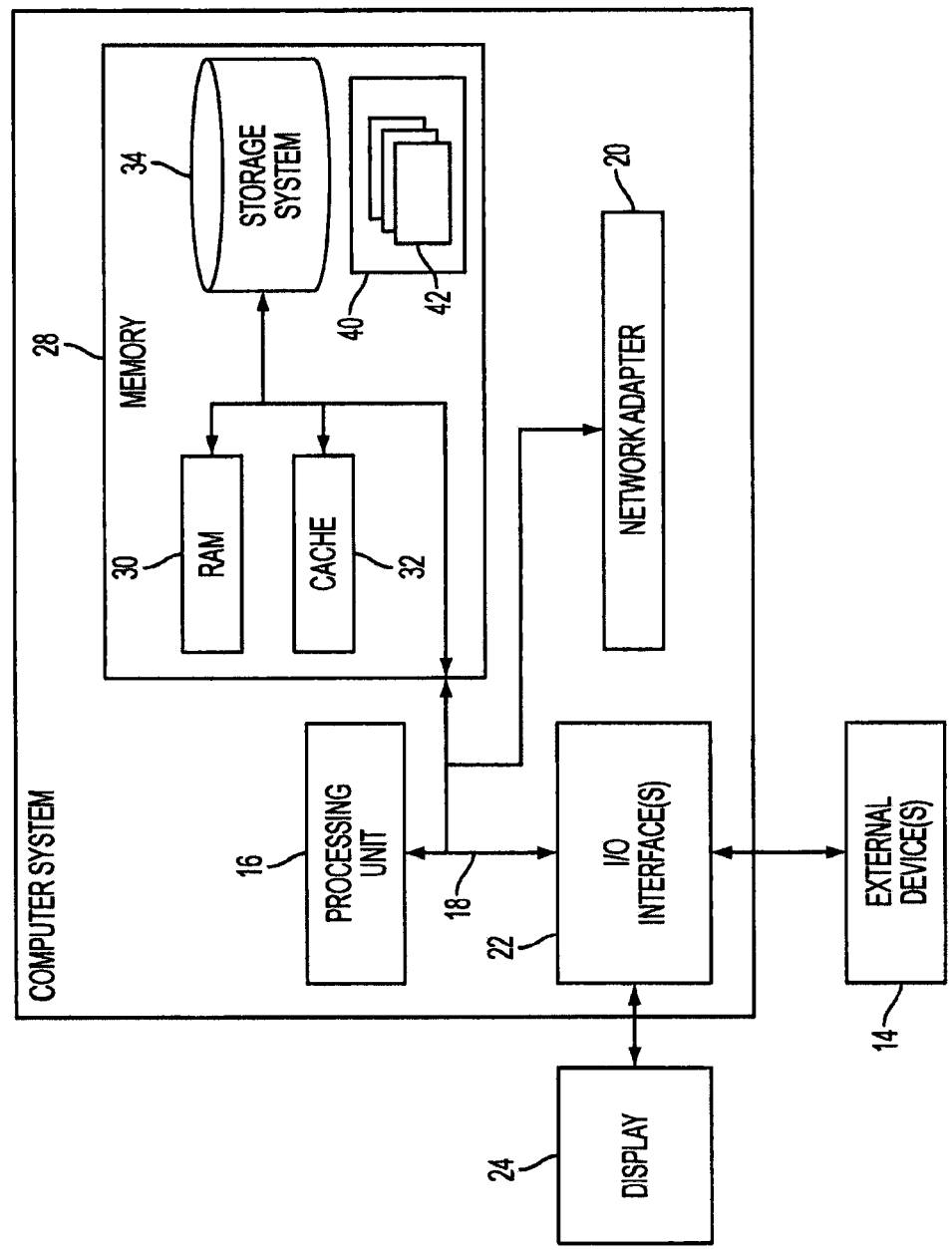
FIG. 1 depicts a block diagram of a computer system according to an embodiment.

Referring now to FIG. 1, a block diagram of a computer system 10 suitable for providing communication over cross-coupled links between independently managed compute and storage networks according to exemplary embodiments is shown. Computer system 10 is only one example of a computer system and is not intended to suggest any limitation as to the scope of use or functionality of embodiments described herein. Regardless, computer system 10 is capable of being implemented and/or performing any of the functionality set forth hereinabove.

Computer system 10 is operational with numerous other general purpose or special purpose computing system environments or configurations. Examples of well-known computing systems, environments, and/or configurations that may be suitable for use with computer system 10 include, but are not limited to, personal computer systems, server computer systems, thin clients, thick clients, cellular telephones, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 10 may be described in the general context of computer system-executable instructions, such as program modules, being executed by the computer system 10. Generally, program modules may include routines, programs, objects, components, logic, data structures, and so on that perform particular tasks or implement particular abstract data types. Computer system 10 may be practiced in distributed cloud computing environments where tasks are performed by remote processing devices that are linked through a communications network. In a distributed computing environment, program modules may be located in both local and remote computer system storage media including memory storage devices.

As shown in FIG. 1, computer system 10 is shown in the form of a general-purpose computing device, also referred to as a processing device. The components of computer system may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 10 may include a variety of computer system readable media. Such media may be any available media that is accessible by computer system/server 10, and it includes both volatile and non-volatile media, removable and non-removable media.

System memory 28 can include computer system readable media in the form of volatile memory, such as random access memory (RAM) 30 and/or cache memory 32. Computer system 10 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 10 may also communicate with one or more external devices 14 such as a keyboard, a pointing device, a display 24, etc.; one or more devices that enable a user to interact with computer system/server 10; and/or any devices (e.g., network card, modem, etc.) that enable computer system/server 10 to communicate with one or more other computing devices. Such communication can occur via Input/Output (I/O) interfaces 22. Still yet, computer system 10 can communicate with one or more networks such as a local area network (LAN), a general wide area network (WAN), and/or a public network (e.g., the Internet) via network adapter 20. As depicted, network adapter 20 communicates with the other components of computer system 10 via bus 18. It should be understood that although not shown, other hardware and/or software components could be used in conjunction with computer system 10. Examples include, but are not limited to: microcode, device drivers, redundant processing units, external disk drive arrays, RAID systems, tape drives, and data archival storage systems, etc.

Figure 2A:
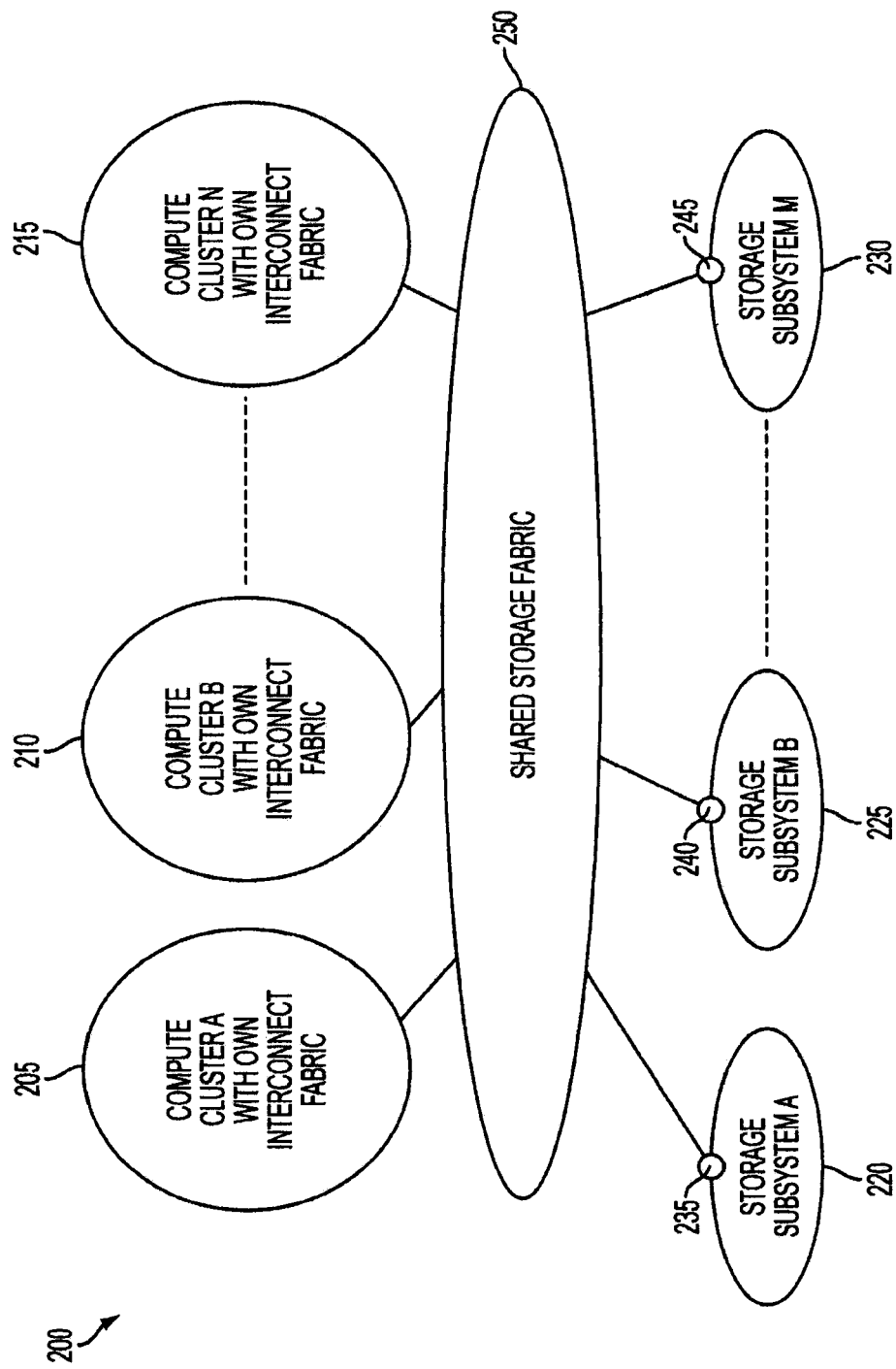
FIG. 2A depicts coupled supercomputers including two or more independently managed compute clusters with a separate shared storage fabric network according to the contemporary art.

With reference to FIG. 2A, contemporary coupled supercomputers 200 may include two or more independently managed compute clusters 205, 210, 215, each with its own interconnect fabric and one or more storage subsystems 220, 225, 230 each with a storage server 235, 240, 245 and a set of storage disks. Each compute cluster 205, 210, 215 may include several compute nodes or entities (e.g., a processor-memory complex), one of more of which are compute clients to the storage server 235, 240, 245. Compute clients on all compute clusters 205, 210, 215 may require access to the storage disks on all the storage subsystems 220, 225, 230 through the storage server nodes 235, 240, 245. This access is typically provisioned using a separate shared storage fabric 245 that is independently managed.

The compute cluster fabric interconnects a number of compute entities. There is a single management domain for all entities in each of the compute cluster 205, 210, 215 so that both ends of all links on the fabric are visible to the management subsystem. Some of the compute nodes act as storage servers 235, 240, 245 in connecting to the storage subsystem 220, 225, 230 through using an interface 250 separate from the I/O router or I/O hub.

Figure 2B:
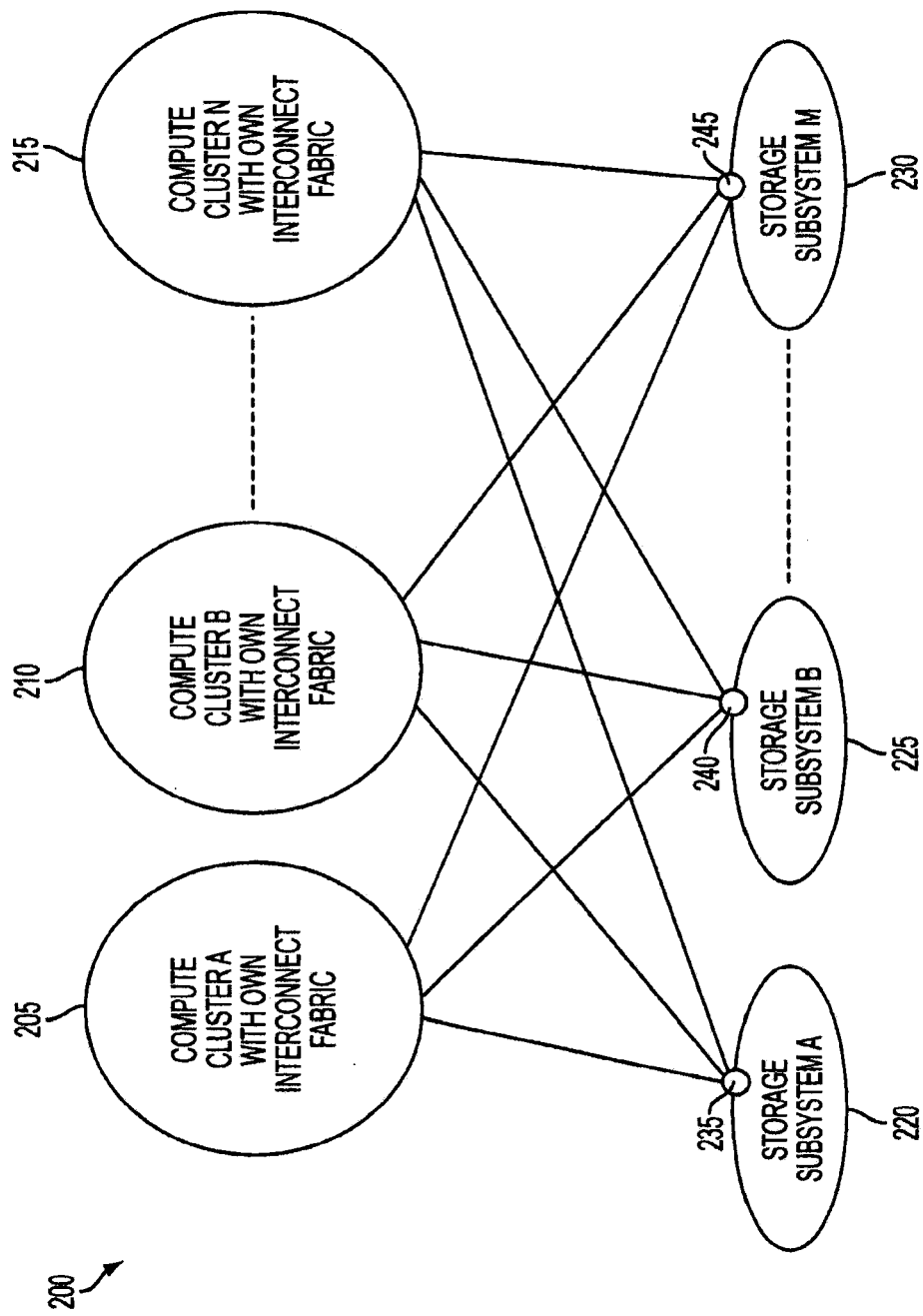
FIG. 2B depicts contemporary coupled supercomputers including two or more independently managed compute clusters wherein the separate shared storage fabric network is eliminated according to the contemporary art.

With reference to FIG. 2B, contemporary coupled supercomputers 200 may eliminate the shared storage fabric network 250 to allow a direct linking of the routers in the client network to the routers on the storage servers 235, 240, 245. Accordingly, the compute clients on the compute clusters 205, 210, 215 are connected to the storage servers 235, 240, 245, thus extending the compute interconnect fabrics into the storage subsystems 220, 225, 230 to preserve the independent management domains of the compute clusters 205, 210, 215. For a network link to be used reliably, the hardware state of the link has to be up and operational as seen by both ends of the link. In a cluster managed by a single management subsystem, a link which has been reported down from one side will be considered down from the other side even if the other side does not experience the fault. Although the linking shown in FIG. 2B may advantageous from a cost perspective, if the routers on the storage server 235, 240, 245 are each managed and/or monitored by a single management subsystem and all systems cannot be globally managed by the same management system, reliable communication over links that couple the distinct networks may be unreliable. Embodiments disclosed herein provide a method, system, and computer program product for reliable communication over those links that couple distinct networks.

Moreover, embodiments disclosed herein ensure that storage servers 235, 240, 245 communicate with compute clients in different clusters 205, 210, 2N15 without interference. The communication between storage servers 235, 240, 245 and compute clients within the compute clusters 205, 210, 215 typically uses the IP protocol over an IP subnet built on top of the underlying network. Broadcasting is a key function necessary to establish the subnet. Cluster interconnects provide this functionality in some manner using a combination of hardware and software support. A typical method is to overlay a hardware broadcast tree over the cluster interconnect. In some cases, broadcast packets from nodes would traverse to the root of the tree through a set of routers and get replicated by the routers on the way down in such a way that each node in the system will get a copy of the packet. A small variation may replicate from the level that can reach a node so that all messages do not travel to the root. In either case, construction and maintenance of the tree would require a global knowledge of the state of the routers and the links of the cluster interconnect. Typically, when multiple broadcast trees need to be set up, any given link cannot be an up link in one tree and a down link in another. It is expensive to avoid this restriction in hardware. This constraint has implications in the cross-coupled environments, as shown in FIG. 1, where there are nodes that need to communicate with different sets of nodes. Another issue in this configuration is the set up and maintenance of trees that span multiple management domains which cannot share information.

Building of broadcast trees is routinely done in Ethernet networks. One contemporary approach uses a Spanning Tree Protocol. The basic feature of this approach is that the root is determined by way of an algorithm that orders the switches to determine a unique root. An inter-switch communication helps establish the spanning tree. This approach may not be suitable for the high speed network environment of supercomputer interconnects. For example, in some supercomputer clusters, the router contains a multicast engine that has hardware tables in which the routes need to be stored. Generating a tree with a pre-assigned root and setting the hardware tables accordingly is not a possibility, since the nodes and the associated routers of the system may become alive in any order and they would need to join the broadcast domain as soon as they are ready. This complexity is increased when the routers are part of multiple management domains and there is no single entity that has a global knowledge of the entire system. One example of links that need to be operational in both directions is the links in the global broadcast tree which will be up links to the root in one direction and down links to the leaves in the opposite direction. It is necessary for the links to be operational in both directions if the cluster requires forward and reverse paths for point-to-point messages to be the same. Accordingly, embodiments disclosed herein provide a method, system, and computer program product to reliably set up and maintain broadcast trees in cluster environments spread over multiple management domains.

Exemplary embodiments disclosed herein facilitate communication between compute clients in two separate high performance computing clusters and storage servers in either cluster subsystem without introducing a separate network for effecting the communication and management of each cluster network. Embodiments disclosed herein assume that both clusters utilize the same router technology.

Figure 3:
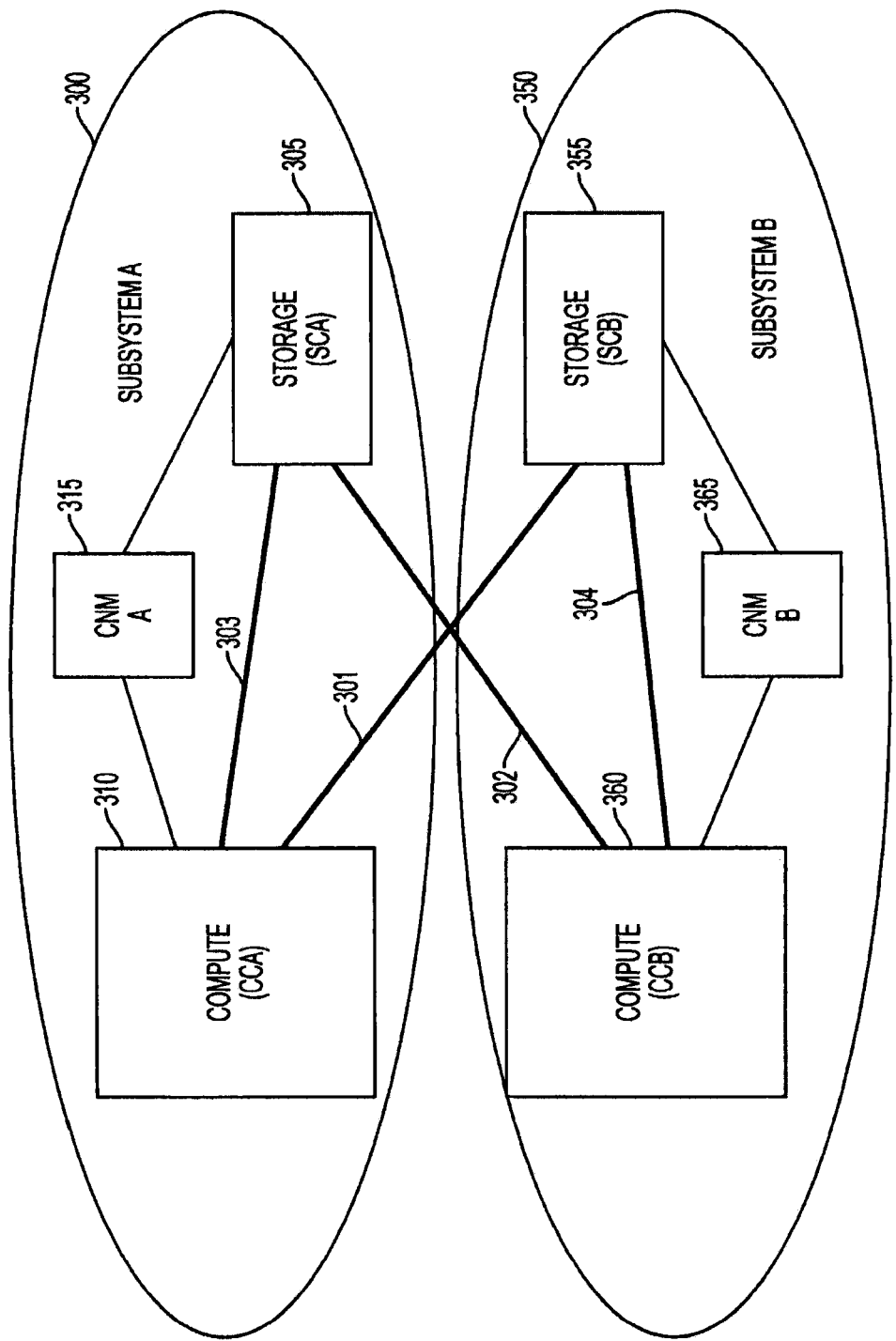
FIG. 3 depicts a representation of two independent subsystems coupled together with cross-coupled links according to an embodiment.

FIG. 3 depicts a representation of two independent subsystems (subsystem A 300 and subsystem B 350) coupled together with cross-coupled links 301, 302 according to an embodiment. According to this embodiment, the storage servers 235, 240, 245 as described in FIGS. 2A and 2B are removed from within the compute cluster supernodes for each subsystem 300, 350. Now, each storage subsystem—storage cluster A (SCA) 305 and storage cluster B (SCA) 355—include a set of single drawers, whose I/O routers connect to compute supernodes of compute cluster A (CCA) 310 and compute cluster B (CCB) 360, respectively. One or more of the nodes in these drawers, henceforth called storage supernodes, may serve as storage server nodes. The server nodes may communicate with compute clients through the I/O routers on one side and with the disk subsystem through the separate interface on the other. There is only one link 303, 304 between each compute supernode and each storage supernode within each subsystem. Each storage cluster may contain more than one storage supernode connecting to the same disk subsystem. All the entities, compute supernodes and storage supernodes within each subsystem 300, 350 are handled by a single management subsystem (central network manager (CNM) A 315 and CNM B 365, respectively).

The two subsystems 300, 350 are then cross-coupled via links 301, 302 such that the storage supernodes in each subsystem are connected to compute supernodes in both. As shown in FIG. 3, CCA 310 is coupled to SCB 355 via cross-coupled link 301 and CCB 360 is coupled to SCA 305 via cross-coupled link 302. There are advantages to provisioning the cross-coupled links 301, 302 in this manner, as opposed to using a separate network. Often, a new router technology introduces a significantly faster link speed, compared to existing technologies, and hence will be desirable for compute to storage communication. A separate compute to storage only interconnect with comparable high speed, if available, will mean additional up front cost and continued maintenance resources. The most straightforward approach is to provide separate interfaces on the storage servers to connect to existing routers on both network subsystems. While this is feasible when the routers reside in external switches and multiple interface ports are available, it may not be possible to divide up an integrated router that resides by the side of the server node. So according to an embodiment, the routers on the compute nodes are allowed to connect to routers on storage server nodes in either storage cluster, SCA 305 or SCB 355. Essentially, from the point of view of the routers, they will appear to be interconnected in some pattern with apparently a path between all interface host pairs.

Given this physical layout shown in FIG. 3, there exists a set of independently managed compute clusters and storage clusters such that any compute node can access any storage node over cluster interconnects shared by both the compute cluster and the storage clusters and that any storage node can access any compute node in any compute cluster. Accordingly, this architecture ensures the availability of a cluster in the event of failure of a compute or a storage subsystem.

Because of this availability requirement, however, the entire system cannot be globally managed by a single management domain. Accordingly, this constraint leads to the coupling links being part of two management domains, CNM A 315 and CNM B 365, leading to problems in ensuring reliable communication between cross-coupled compute and storage subsystems. Generally, a storage node must be aware of the boundaries that exist between compute clusters, and between itself and other storage clusters in a network. While resource partitioning such as this is possible when we have a single management domain, there are situations where a single management domain is not desirable in such a distributed system. Multiple management domains may be needed for reliability and for the flexibility of adding or removing a compute cluster without affecting the operation in any of the existing clusters.

Accordingly, the status of the set of links wholly within one management domain may not be available to the other management domain. This affects support of functions such as global broadcast that rely on global knowledge of the network. There are two broadcast trees in the cross-coupled system in FIG. 3: (i) CCA 310+SCA 305+SCB 355, and (ii) CCB 360+SCA 305+SCB 355. Subsystem A 300 can build the CCA 310+SCA 305 part of tree (i) but not the SCB 355 part. Similarly, subsystem B can build the CCB 360+SCB 355 part of tree (ii) but not the SCA 305 part. While both ends of a link 303, 304 will be visible to its management subsystem (CNM A 315 and CNM B 365, respectively) when the link 303, 304 connects two nodes within the same subsystem, only one end will be visible when they cross-couple nodes in different subsystems. Essentially, at the level of an individual link, both sides will eventually synchronize on link based events. However, there are a set of events in hardware external to the link, for example, I/O router events or drawer events, which can cause a problem when the other side is not aware of the problematic set of events. In such cases the global broadcast tree will lose the branch between compute and cross-coupled storage if the link that forms the branch is seen as up and operational from one end and down and faulty at the other end.

According to exemplary embodiments, coupled clusters are configured such that half the storage servers and their associated storage are placed in one compute cluster's management subsystem and the rest are placed in the other compute cluster's management subsystem. In the subsequent discussion, a cluster is defined as having both compute and storage within a single management subsystem. While both ends of a link 303, 304 within the cluster will be visible to its management subsystem when the link connects two nodes within the same subsystem, only one end will be visible when they cross-couple nodes in different subsystems. Embodiments disclosed herein address the management of the cross-coupled links 301, 302. While providing reliable communication in cluster environments, often a link cannot be made active in the network unless routers on both sides see an operational link. Embodiments disclosed herein circumvent the need for explicit knowledge of both link endpoints while ensuring reliable communication, both unicast and multicast, over cross-coupled links 301, 302 without any information being exchanged between the management subsystems 315, 365.

Further, as discussed above, generally in cluster environments, the nodes need to be made job ready as soon as they come up. There is no guarantee about the order in which nodes will come up. Also, parts of the system may become unavailable for one of a number of reasons. Embodiments disclosed herein allow a node to join the network by joining it to a multicast tree. So as cluster components come up, the spanning tree will be built per the constraints of the underlying hardware. The concerned routers and their immediate parents will be updated. Unless a fault occurs, a router once set up will maintain its setting until the tree is rebuilt for any reason. If any branch of the tree gets broken due to a link or router failure, the tree will be repaired. Such repair will typically involve a small fraction of the routers in the cluster. All this is possible to do when all components of the tree are visible to a single management domain. Additional complexity arises when a node has to be part of two or more multicast trees one or more of which extend across management domains.

Accordingly, exemplary embodiments disclosed herein construct the tree such that the root of the tree will always be in the dense compute region and the few shared storage sever nodes are always placed at the bottom of the tree. This means no compute node will be a child to any storage server node; however, some storage server nodes may be a child to other storage server nodes. For multiple multicast domains each spanning a compute cluster and all the storage clusters there is a constraint that no links within the storage clusters should be an uplink for one tree and a down link for another tree. Any solution to this constraint should be fault tolerant. While it will be possible to construct such trees, with effort, when their components are under the same management domain, it is hard to guarantee a link will not be part of two trees in opposite directions when the management domains are independent. Accordingly, exemplary embodiments proved the identification of a set of "glue routers" on the storage side to find a branch between independently managed regions and also avoid up-down collision on any link under any circumstance.

Figure 4:
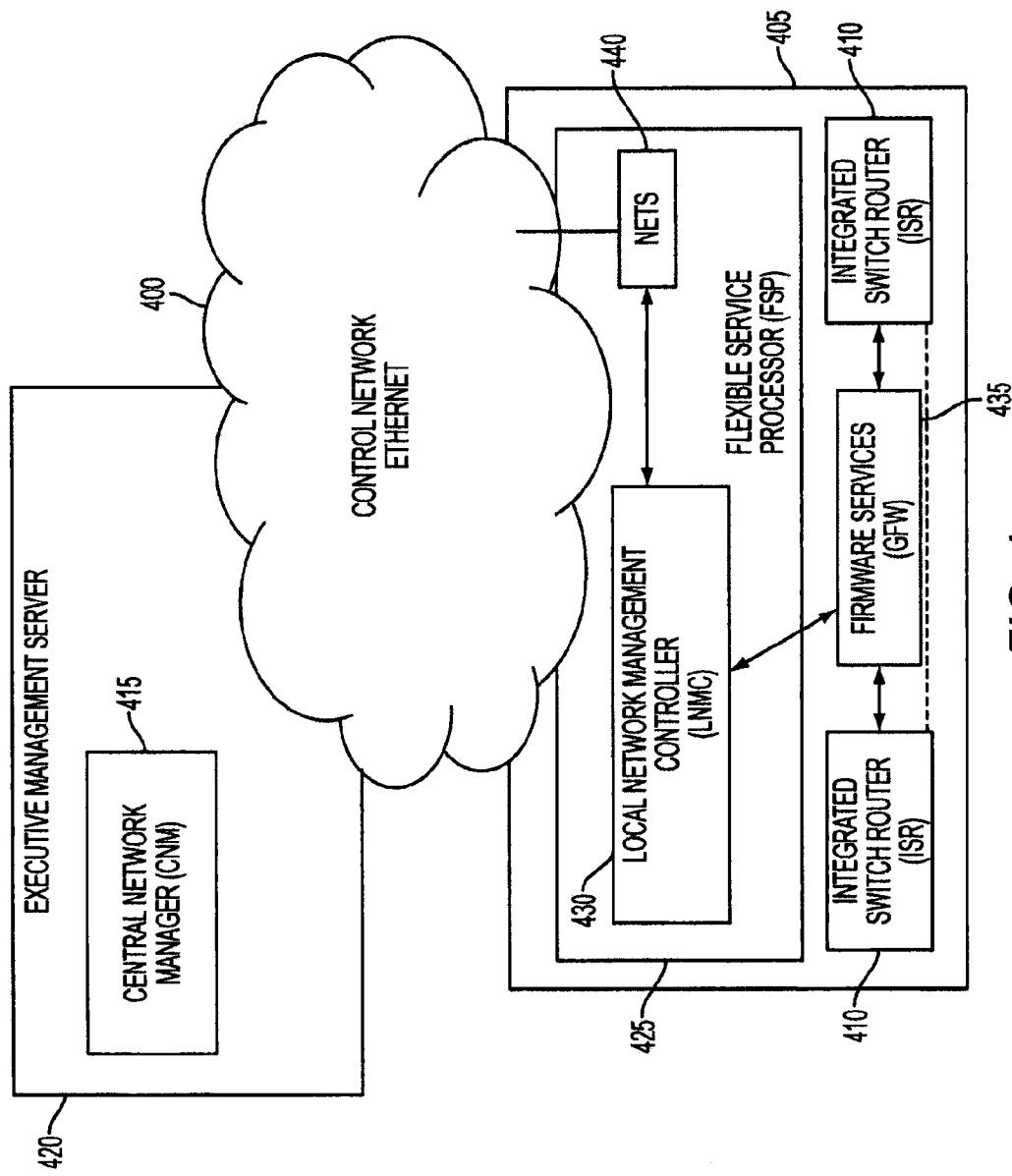
FIG. 4 depicts a functional view of a control network Ethernet and the software/firmware entities used for managing a cluster according to an embodiment.

FIG. 4 discloses a functional view of a control network Ethernet 400 and the software/firmware entities used for managing a cluster according to an embodiment. According to an embodiment, the cluster uses a unique logical identifier, called a location identifier (ID), for every node in the cluster, which is a concatenation of the supernode number, the drawer within super node, and the I/O hub within the drawer 405. Each I/O hub houses an Integrated Switch Router (ISR) 410 which has electrical links, called Llocal or LL, to other ISRs in the drawer, and optical links, called Lremote or LR, to other drawers in the supernode.

There are four drawers in a supernode, with all to all connectivity between their ISRs 410, through the LR links. There are a varying number of links, called distance links, between supernodes, depending on the topology of the cluster, which determines the drawer-hub-port combination for the two sides of a link. The unique supernode number is determined by the placement of the supernode in the topology. A high level description of how the cluster interconnect network is managed is provided to highlight the issues created by a one-sided link.

The cluster interconnect is basically a set of ISRs 410 linked to each other by high speed electrical or optical links. It is managed through an out of band control Ethernet and a central network manager (CNM) 415 which runs partly on the Executive Management Server (EMS) 420 and partly on the Flexible Service Processors (FSPs) 425 associated with the drawers (CEC) 405. Network events are monitored by a local network management controller (LNMC) 430 using firmware (GFW) 435 services. LNMC 430 maintains the state of the links and shares this knowledge with CNM 415 in a structure called a link usability mask. This mask will contain a zero or a one for each of the ports on the router based on whether the port is unusable or usable. CNM 415 processes the link usability information received from LNMCs 430 and redistributes it, as is necessary, to the neighboring LNMCs 430. The LNMCs 430 use local as well as remote link usability information to set up the routing tables in the ISRs 410. In the process of route table set up, a few more exchanges of different data may take place between the CNM 415 and LNMCs 430.

For a network link to be used reliably, the hardware state of the link has to be up and operational and seen as such by both ends of the link. Multiple levels of checking may be deployed to ensure the usability of a link between CECs 405. At the lowest level, the ISRs 410 at either end maintain the status of the link, from their point of view, based on whether traffic flows between both sides without any errors. The ISR logic may decide to take a link down based on the hardware state and to report the state to the LNMC 430. The LNMC 430 will mark the link down and send the updated link usability mask to CNM 415 via a network interface service (NETS) 440. A link which has been reported down from one side will be considered down from the other side. This is essential for all cluster functions that rely on being able to pass data over a link on in both directions. One example is the links in the global broadcast tree which will be up links to the root in one direction and down links to the leaves in the opposite direction. It will also be necessary for the links to be operational in both directions if the cluster requires forward and reverse paths for point-to-point messages to be the same.

According to an embodiment, no two supernodes in the cross-coupled system are assigned the same supernode number. That places a restriction on the number of storage supernodes that can be supported. An embodiment also supports single drawer supernodes such that the I/O hubs will not be populated with optical ports that support LR links. The list of standard topologies supports either four drawer supernodes or single drawer supernodes but not both within the same topology. The storage subsystems do not need to incur the additional cost of the numerous LR ports and hence will use single drawer supernodes.

While an embodiment in this disclosure uses two compute and two storage subsystems, embodiments may be generalized based on the constraint that there may be a maximum number of supernode identifiers at 512. This is the limit imposed by the router architecture. In general, it is possible to support the architecture as an extension to various base topologies, by varying the compute and/or storage server supernode counts, the number of compute clusters and the number of storage clusters. In addition, the number of storage clusters (NSC) does not necessarily need to be equal to the number of compute clusters (NCC). In the following example, an embodiment assumes that all compute clusters have the same supernode count (CN) and the same number of D ports per hub (DP). Also, all storage clusters have the same number of supernodes (SN). ND is the number of D links between a pair of supernodes on the compute clusters. They are always a power of two. The compute supernodes will minimally have ND unconnected ports, since a supernode does not connect to itself. These are referred to as self-ports. In addition, the cluster may not be populated to full capacity. In that case, there will be multiple of ND ports that are vacant. These are referred to as free-ports. The constraints of an embodiment are:

(i) CN+SN*NSC<=512/ND (ii) The constraint on the number of compute supernodes is CN<32*DP/ND, where DP is the number of D ports per hub on the compute cluster (iii) If self ports are used for storage supernodes to compute supernodes, then SN<=ND/(NS*CtoS), where CtoS is the number of D links between a compute supernode and a storage supernode (iv) If free ports are used for storage supernodes to compute supernodes, then SN<=(32*DP−CN*ND)/(NS*CtoS)

(v) When all compute clusters have the same supernode count CN then number of D ports per hub on storage supernodes DPS should satisfy the condition 8*DPS>=NCC*CtoS*CN+StoS*SN, where StoS is the number of D links between storage supernodes.

The actual supernode IDs that may be assigned to storage side supernodes are those that are not used in any compute cluster. Referring back to the two subsystem example of FIG. 3, in the standard clusters, supernode IDs in the range of 0 to max_supernodes are assigned. It is noted that max supernodes will be (32*DP/ND). The ID depends on the drawer-hub-port designated for the supernode in the topology. In this embodiment, the range will be used for CCA 310 supernodes. The supernodes in CCB 360 will be offset by max_supernodes. The SCA 305 nodes will be assigned supernode IDs associated with free-ports if they are used for cross-coupling. If self-ports are used, an unused supernode ID within the range will be used. Note that cross-coupling will not be possible if the compute side contains max_supernodes. The SCB 355 supernodes will be assigned an ID unused in the offset range.

During the initial install of the system, the information about all supernodes on all clusters will be placed in the cluster database of all EMSes 420. This information includes the physical location of the supernodes in terms of Frame/Cage and the logical supernode ID. The topology identifier for the clusters will also be entered. The two subsystems 300, 350 will have a different topology identifier which would help network management code to determine which supernodes are expected to be in the local domain and which are in the remote domain.

Figure 5:
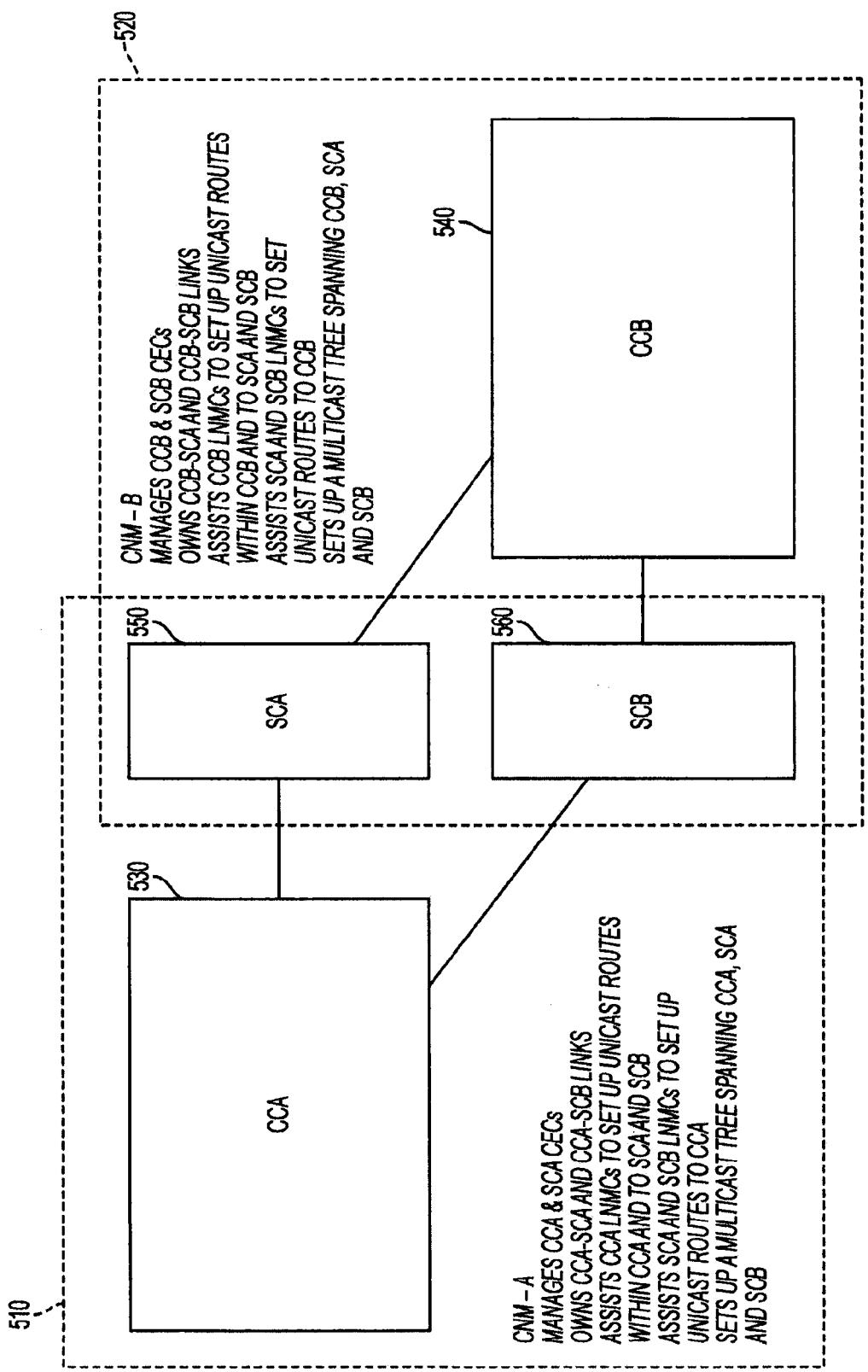
FIG. 5 depicts a management domain and functions supported by the two central network managers.

FIG. 5 depicts the management domain and the functions supported by the two CNMs 510, 520. CNM A 510 manages CCA 530 and SCA 550. CNM A 510 will not communicate with SCB 560 even though SCB 560 is connected to CCA 530. Similarly, CNM B 520 manages CCB 540 and SCB 560. CNM B 520 will not communicate with SCA 550 even though SCA 550 is connected to CCB 540. Since the cluster database contains all information from Cluster A and Cluster B, each CNM's internal device database will have frame/cage/supernode/drawer/port information for links that are not visible to the CNM in the local cluster. That is, the CNM device database will contain information for the "other side" of the cross-coupled links, even though the local CNM cannot contact the drawer in which the other side resides. This enables a CNM to create expected neighbors for the links between CCA 530 and SCB 560 and for the links between CCB 540 and SCA 550.

Referring back to FIG. 3, the system of an embodiment includes two subsystems with their own management domains. According to an embodiment, a tree may be built such that SCA 305 and SCB 355 nodes are at the bottom of the tree and each drawer in SCA 305 and SCB 355 will have an uplink to the compute clusters 310, 360. This means no CCA 310 or CCB 360 node will be a child to any SCA 305 or SCB 355 node, however some SCA 305 and SCB 355 nodes will be a parent to other SCA 305 or SCB 355 nodes. According to an embodiment, multiple multicast domains are provided, specifically two in this configuration. One tree will span CCA 310, SCA 305 and SCB 355 and the other will span CCB 360, SCA 305 and SCB 355. The constraint then is that no links within SCA 305 or SCB 355 should be uplink for one tree and down link for another tree. An embodiment should be fault tolerant so that it is possible to rebuild or repair the trees when faults occur such that the resulting trees span all good nodes in their domain.

An ISR of an embodiment 410 includes a hardware multicast engine on it. This engine has the capability to replicate and send packets out through multiple ports. The ports through which packets are to be sent out are placed by management software in a hardware table entry as a port mask. The entry also contains an up port identifier which will be set to the port that leads to the root of the tree. The table has the capacity to hold the patterns for a small number of trees that can have different roots. The access to these entries is through an index into the table called group ID. While multiple trees can be supported, any specific link cannot be an up link on one tree and a down link on another tree.

Figure 6:
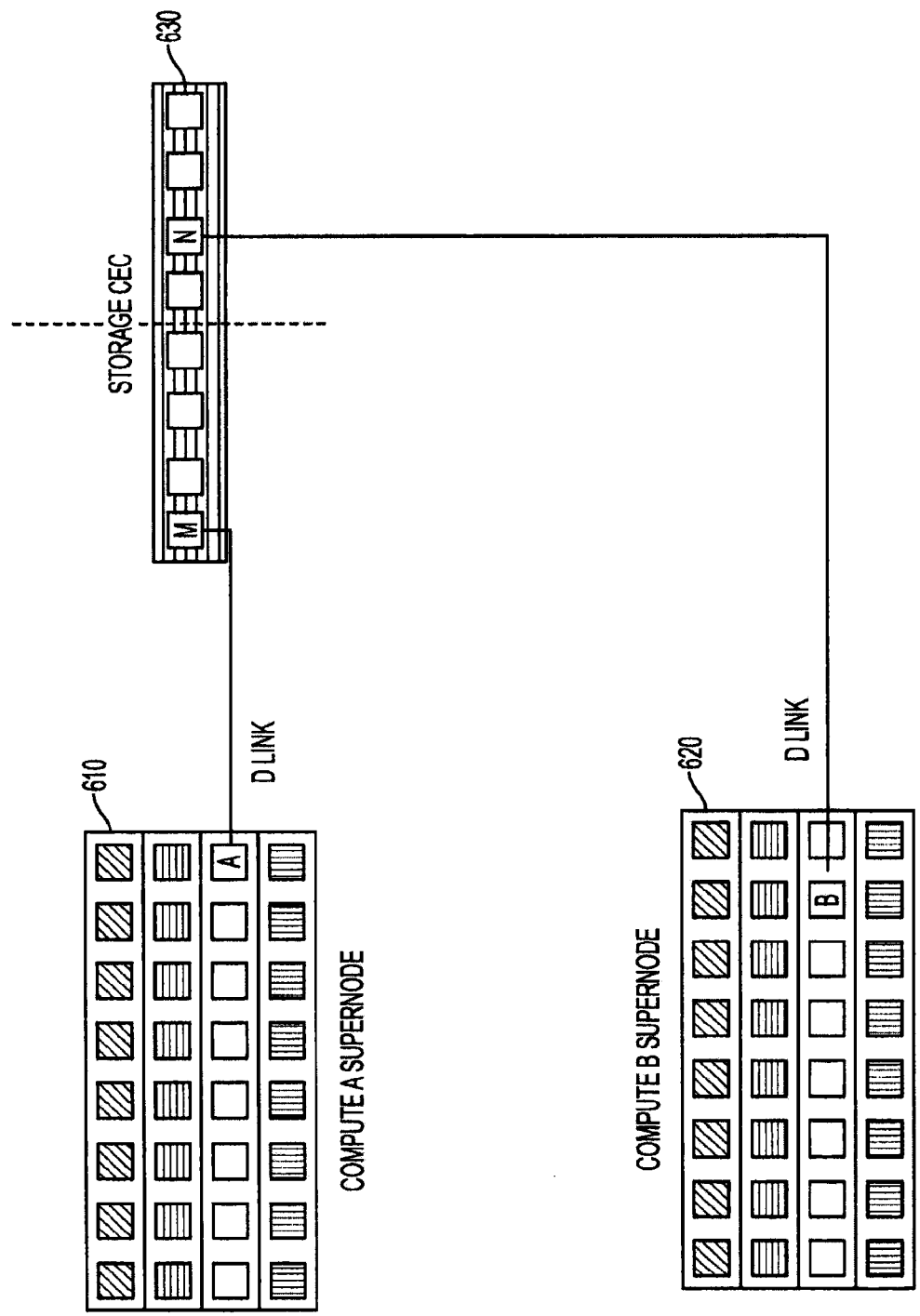
FIG. 6 depicts a linking connection between compute entities and storage entities in a drawer according to an embodiment.
Figure 7:
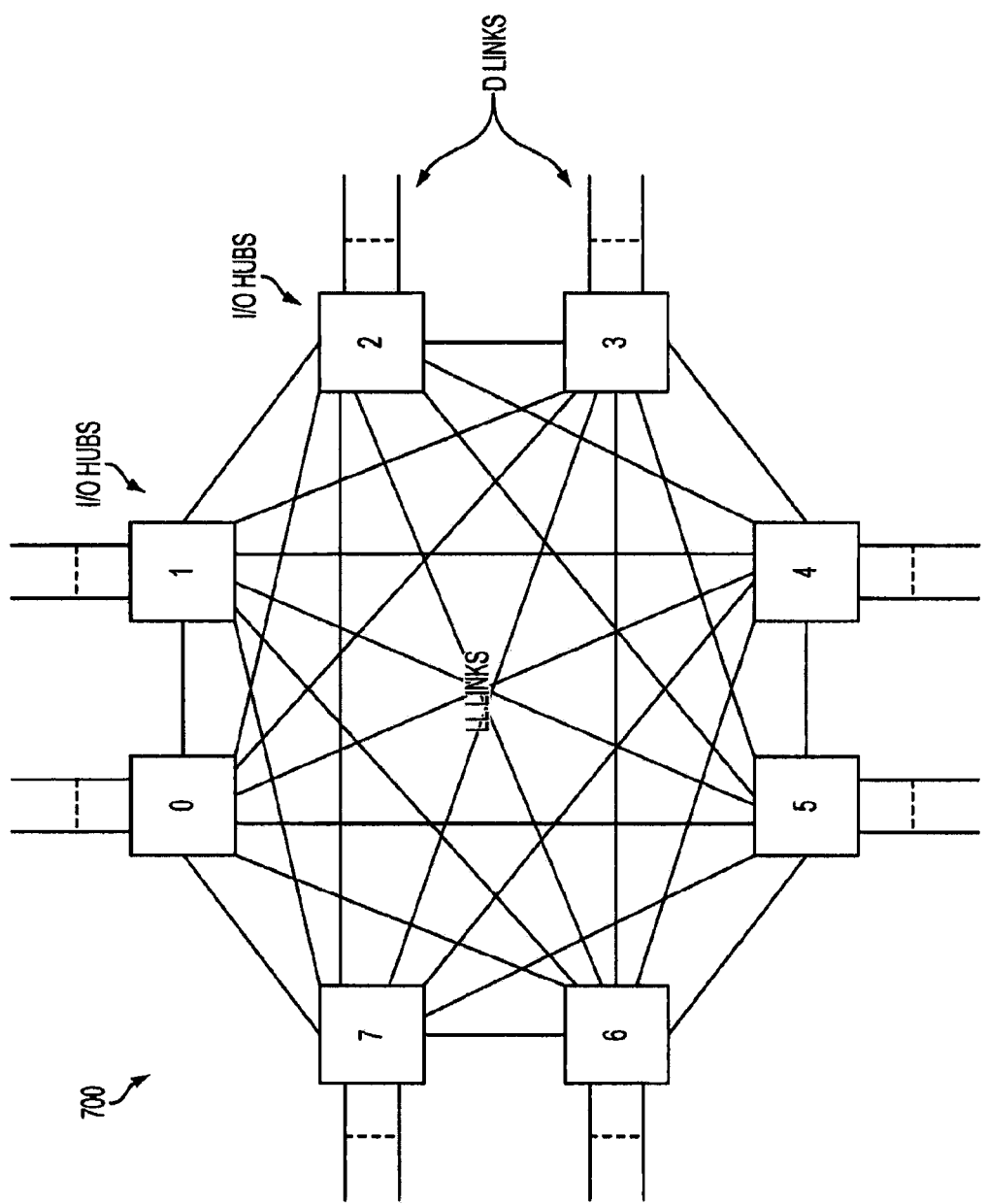
FIG. 7 depicts a representation of a storage drawer with its internal connections according to an embodiment.

Referring to FIG. 6, in order to ensure storage servers communicate with compute clients in different clusters without interference, CCA supernodes 610 are connected to one half of SCA and SCB drawers 630 and CCB supernodes 620 are connected to the other half as shown in FIG. 6. A complete representation of a storage drawer 700 with its internal connections is shown in FIG. 7.

CNM A may build and maintain a multicast tree that spans CCA and SCA (multicast domain A). Likewise CNM B can build and maintain a multicast tree that spans CCB and SCB (multicast domain B). However, both these trees need to cross over the coupling links into the other storage domain. CNM A would need to build its tree to include SCB even though it has no knowledge of the state of SCB, which is not possible. Similarly, CNM B cannot include SCA in its tree.

Accordingly, an exemplary embodiment has CNM A build a sub-tree spanning SCA for multicast domain B and CNM B build the sub-tree spanning SCB for multicast domain A. Since SCA and SCB nodes need to support both trees, they need to be distinguished from each other according to an embodiment. This distinction is provided by using a group identifier. CNM A's tree will be given group ID 0 and CNM B's tree will be given group ID 1. An appropriate group ID is placed in the broadcast packets by the senders. In the illustrative example, drawers are the physical units that are powered up. So, nodes in a drawer may come up at the same time. When a cluster is brought up, the drawers can be powered up in any order. Therefore, in building the multicast tree on the cluster, an I/O hub in the first drawer seen by CNM is picked to be the root according to an embodiment. If CNM starts up after some drawers are powered up, the root is selected per an algorithm. Other hubs in the root drawer as well as hubs in other drawers are added to the tree ensuring there are no loops according to an embodiment. There are no limitations on the number of branches at any tree hub. However, there is a maximum depth set by the hardware. In a single domain cluster, there is enough leverage to build the tree. The tree is repaired and maintained in the event of link or hub failures.

In order to extend the multicast broadcast tree into the cross coupled storage, an exemplary process of an embodiment implements the following rules:

1. The root hub of a multicast tree must always be on the compute cluster.

2. No storage hub can be a parent to a compute hub.

These two rules together ensure that parent-child relationship will never be reversed over compute to storage links.

3. Additionally all storage drawers will be leaf drawers in both trees, that is, no storage hub in one drawer will be a parent to a storage hub in another drawer. This condition will avoid reversal of a parent-child relationship over links connecting them.

4. Either tree is built partly by CNM A and partly by CNM B.

a. CNM A will build the rooted part of group ID 0 tree spanning CCA and SCA and a small sub-tree for group ID 1 spanning SCA.

b. CNM B will build the rooted part of group ID 1 tree spanning CCB and SCB and a small sub-tree for group ID 0 spanning SCB.

Partial building is necessary since the CNM building the tree needs to download the multicast table into the hardware and it does not have access to hardware on the cross-coupled storage.

Figure 8:
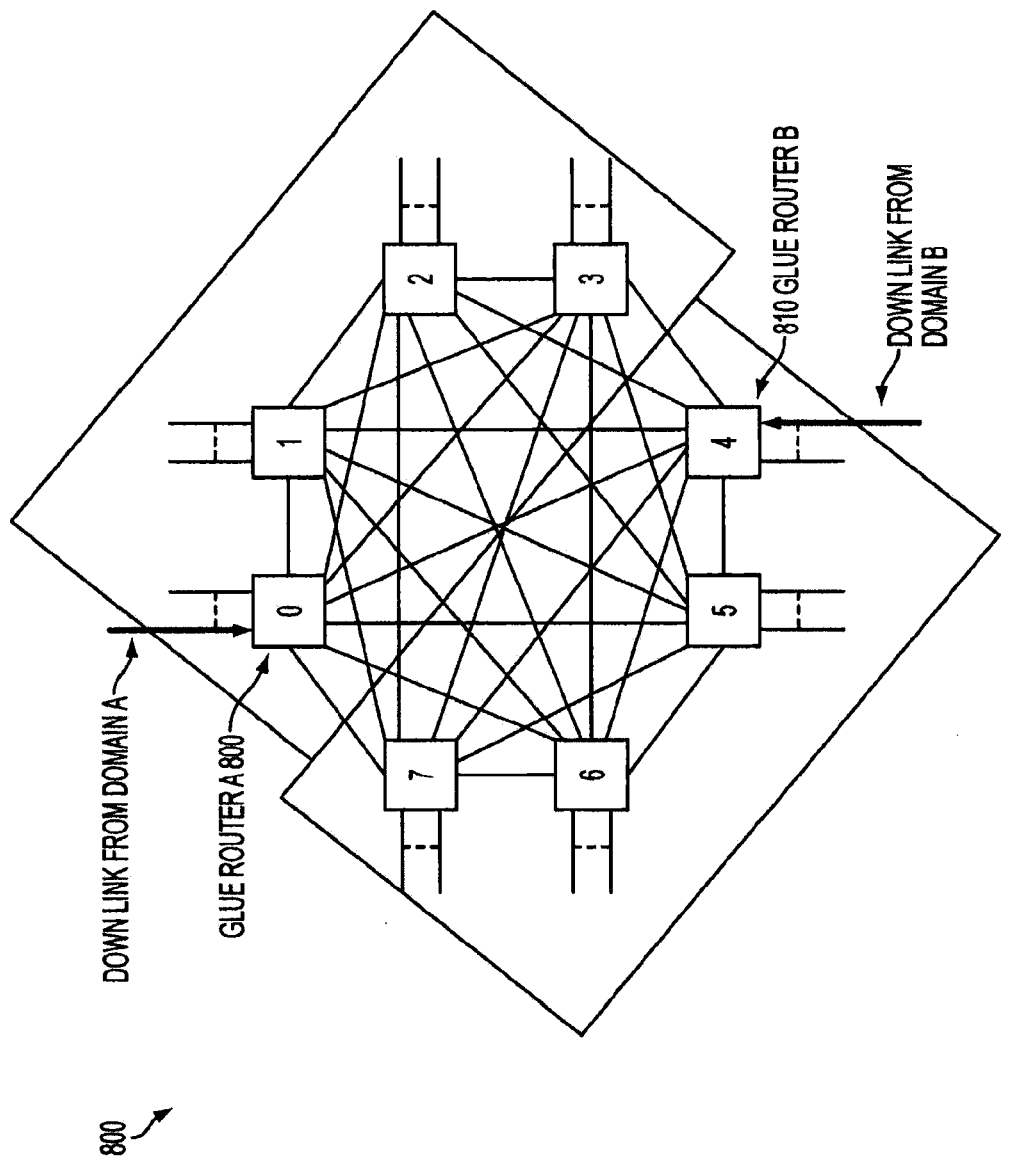
FIG. 8 depicts a representation of glue routers that link routers belonging to different management domains according to an embodiment.

5. The rules stated below will ensure the two CNMs will have a consistent branch between compute and storage supernodes.

a. CNM A will place one branch into each storage supernode and this branch will be to the lowest active hub having a connection to its compute supernode. This will be one of hubs 0 through 3 according to an embodiment.

b. CNM B will place one branch into each storage supernode and this branch will be to the lowest active hub having a connection to its compute supernode. This will be one of hubs 4 through 7 according to an embodiment.

c. On the selected hub, the highest D port will be used as the uplink port.

d. Since the multicast tree is built dynamically, it is not guaranteed that the link to the highest D port on the selected hub will be active when the hub comes up. So the process of an embodiment shall keep dynamically adjusting the incoming branch to the storage sub-tree to always be on the highest available D port. This rule is the crux of building the blind connection. The selected hubs are the glue routers 800, 810 that link routers belonging to different management domains as shown in FIG. 8.

6. The process of an embodiment ensures that the depth of the tree does not exceed the maximum. In the event the depth is exceeded while adding a storage drawer or while repairing the tree, the supernode on the compute side of the branch will be moved higher into the multicast tree. This will ensure blind connection is preserved and hence rule 5 is not violated.

7. When a compute to storage link that is part of a multicast tree goes down, a. The branch to the storage sub tree will be moved to the link connecting to the next highest available port on the storage hub. If no other port is available, it will be moved to the link connecting to the highest available port on the next storage hub.

b. Storage side will also be adjusted to move to the corresponding port. This condition will always be satisfied because if a link goes down on one side, it will drop from the other side too.

8. Loss of all cross links from a compute cluster to a storage hub is likely a signal of loss of that storage hub. If there are active links to other hubs on that storage supernode, adjustments are made as follows, according to the process of an embodiment:

a. The branch to the storage sub tree will be moved to the link connecting to the highest available port on the next storage hub.

b. Storage side will also be adjusted to move to the hub next to the lost hub. The assumption made here is safe, since the chances of losing many links on a hub with the hub being active is extremely low.

Figure 9:
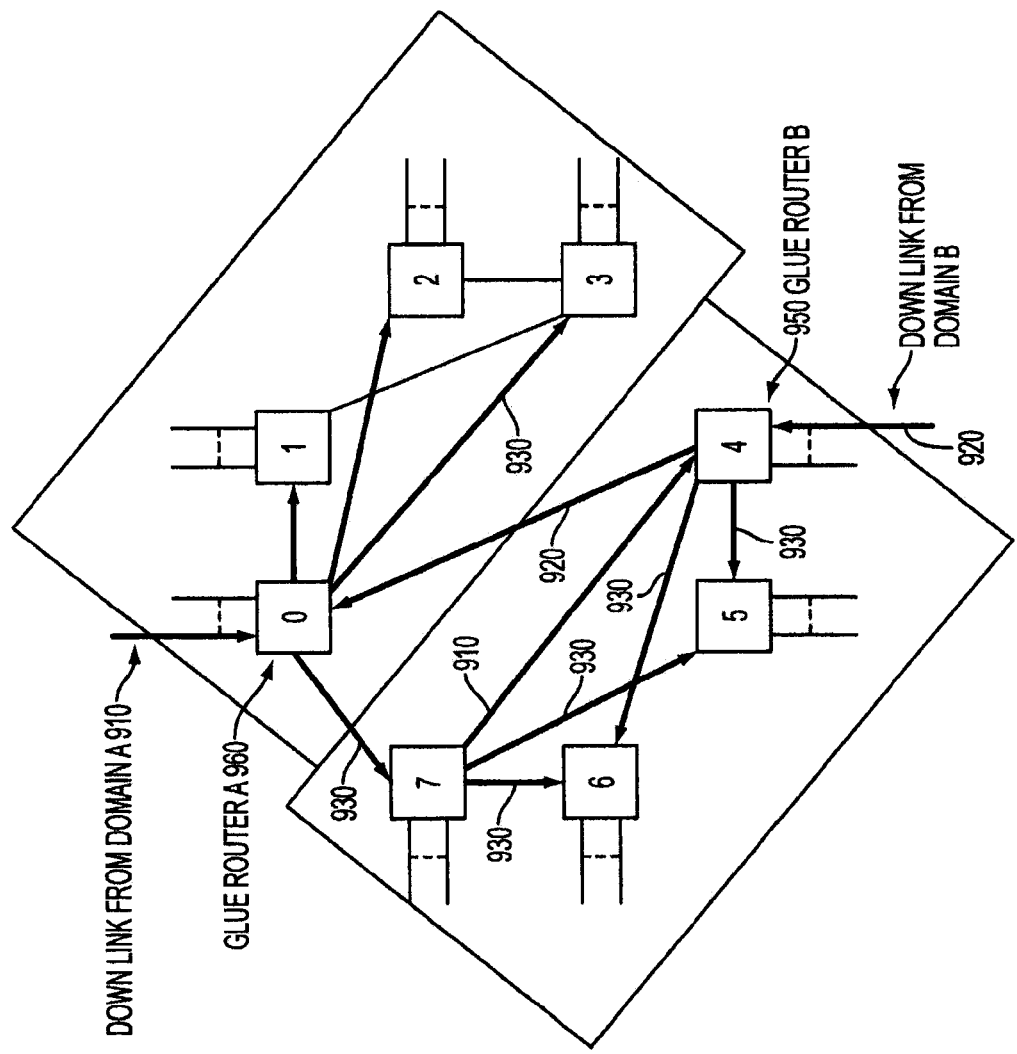
FIG. 9 depicts a representation of making one of the glue routers a parent to another glue router according to an embodiment.

9. No LL link on a storage supernode that is part of a tree can have reverse parent-child relationship in the other trees. This is a condition imposed by the hardware. The multicast engines on either side can deadlock if this condition is not satisfied. If the glue routers 800, 810 are made the root of the sub-tree within the storage supernode, there is a potential for deadlock over the link between them. FIG. 9 illustrates how the condition is broken according to an exemplary embodiment, by making one of the glue routers a parent to the other. The link 910 is part of the group ID 0 tree, link 920 is part of the group ID 1 tree and the other links are part of both trees. According to an exemplary embodiment, when there is more than two compute clusters, one of the glue routers will be made a parent to all other glue router so that a link cannot be an up link in one tree and a down link in another tree in the same link direction. Referring to FIG. 9, glue router B 950 is made the parent of glue router A 960. Accordingly, this will avoid reversal of a parent-child relationship over link 920. Thus, glue router A may not transmit to glue router B using link 920 and must, instead, transmit via hub 7 using link 910.

According to another embodiment, in order to manage the cross-coupled links, the links may be given a special personality as "cross-coupled". All internal data structures related to this type of the link will contain the personality field. All commands that query links will display the personality as well. According to an embodiment, links that are cross-coupled are also called "one-sided links" referring to the fact that only one end of the link is visible to the management domain. CNM will need to set link status for one-sided links based on knowledge from the local domain only. That is, cases where CNM waits to hear from both ends of the link before setting the status will need to set it based on a single input, in the case of one-sided links. Hence, some special considerations are applied to handling of one-sided links according to an embodiment. Most link statuses that incorporate information about the status of a neighbor link or drawer are not applicable to one-sided links according to an embodiment, such as:

_DOWN_NBRPOWEROFF: Link is down because the neighboring CEC is powered off.

_DOWN_NBR_DISABLED: The CEC on the far side has been disabled.

CNM will not be able to distinguish these from DOWN-_FAULTY. DOWN_FAULTY is typically given to links when LNMC on both sides report the link is down. All three states refer to a link that is unusable and no attempt will be made to route packet over the link in any of these states. So, not being able to distinguish between them is not critical. Essentially, at the level of an individual link, both sides will eventually synchronize on link based events. There are a set of events in hardware above the link, for example, ISR events or the drawer events, which may cause an error when the other side cannot hear about them. One such event is when the administrator decides to power off a CEC and triggers a pending POWEROFF event in CNM. In response, CNM would set the other end of the links from the CEC to DOWN_NBRPENDINGPOWEROFF. This would be propagated to the neighbors, so that they can adjust the routes before the actual action takes place and network packets are not lost. This adjustment is not possible across cross-coupled drawers since a pending power off notification will be seen only by the domain owning the drawer scheduled to be powered off. Transitory loss of packets after the neighbor is actually powered off has to be tolerated.

Serious errors or faults may arise when a drawer gets into a terminate state. This condition often happens when one of the nodes in the drawer experience a serious fault. Under these conditions, the routers are still kept alive since they also provide pass through functionality. CNM is notified so that it can adjust routes in the system to circumvent the limping compromised drawer. Such rerouting will not affect point-to-point traffic as long as the forward and reverse traffic does not need to go over the same set of links, of course in opposite directions. Errors or faults may also arise in broadcast propagation. In a standard cluster, the multicast tree is adjusted if the I/O hubs of a failed drawer are intermediate nodes of the tree. In the cross-coupled environment, the multicast broadcast tree is set up partly by one CNM and partly by the other based on rules built into the process of an embodiment. In the case of any failure leading to link down of the cross-coupled links, both CNMs will see it and adjust the tree accordingly. In this way, the broadcast function will not be broken. However, in cases such as the terminate state, the other side will still see an operational link. So while one side will adjust the tree to move away from the compromised drawer, the good side will be unaware and the tree will be broken.

According to an exemplary embodiment, the CNM on the near side disables the cross-coupled link so that the other side will see a hard link down. The CNM on the far side will detect the link has failed and hence rebuild its part of the multicast tree according to an embodiment. The link on the near side will be marked as DISABLED for cause so that when the drawer is powered down and brought back on the link will be included into the network (as long as it comes up OPERATIONAL). According to this embodiment, forcing the link down is preferable to leaving the multicast tree unrepaired on the near side. The rationale behind this decision is that there are many conditions seen by the ISRs and by the drawer that are lumped into a drawer unusable state and some of these events may not be conducive to proper data traffic. There will be, however, a need to keep the drawer powered up to collect information for debug according to an embodiment.

Moreover, if either the multicast service engines on the I/O routers on the two sides of a cross-coupled link in the multicast tree fail, the far side will not be aware of the outage and the link will be seen as OPERATIONAL from both ends. The near side will adjust the multicast tree to avoid the router with bad multicast service engine. According to an exemplary embodiment, the CNM on the near side will disable the cross-coupled link so that the other side will see a hard link down. The CNM on the far side will detect the link has failed and hence rebuild its part of the multicast tree. The link on the near side will be marked as DISABLED for cause according to an embodiment. As long as the multicast service engine is faulty, the link will be left DISABLED.

Figure 10:
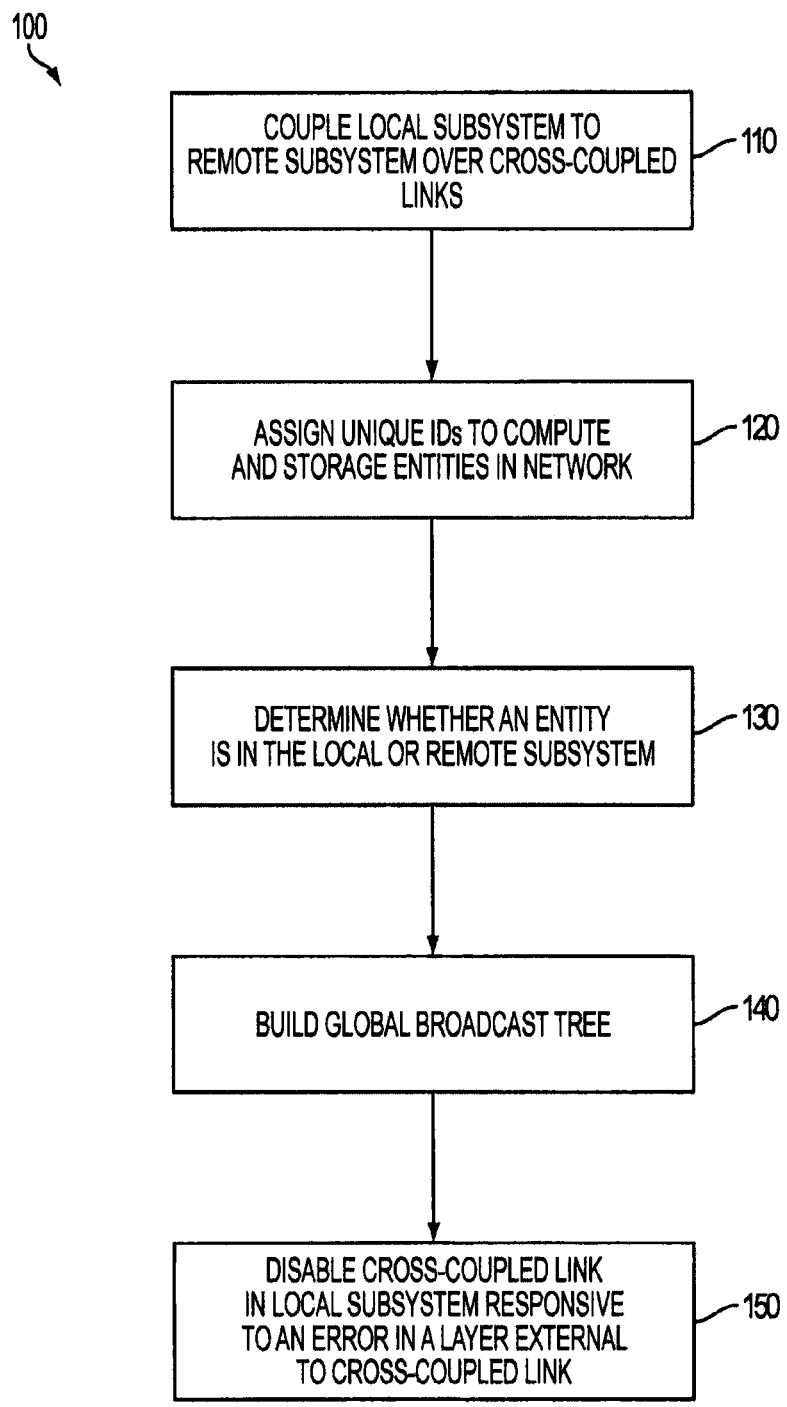
FIG. 10 depicts a process for providing reliable communication over cross-coupled links between independently managed compute and storage networks according to an embodiment.

With reference to FIG. 10, a process 100 performed by an embodiment of a processing device 16 of computer system 10 is generally shown. As shown in FIG. 10, the process 100 ensures reliable communication over cross-coupled links between independently managed compute and storage networks according to an embodiment.

At block 110, an independently managed local subsystem is coupled with an independently managed remote subsystem over cross-coupled links, wherein each subsystem includes compute entities and storage entities. At block 120, unique identifiers are assigned to the compute entities and the storage entities in the local network and the remote network. At block 130, a central network manager of the local subsystem determines whether each entity is in the local subsystem or the remote subsystem. A global broadcast tree is then built to bridge the compute entities in the local subsystem to the storage entities in both the local and remote subsystem, as shown in block 140. At block 150, responsive to an error in a layer of the local subsystem external to a cross-coupled link, the cross-coupled link in the local subsystem is disabled so that the remote subsystem can see a hard link down and rebuild its part of the global broadcast tree.

According to an embodiment, the assigning of the unique identifiers further includes varying a number of storage entities that can be supported based on a configuration of the compute entities. According to another embodiment, the cross-coupled link is marked as a one-sided link by the central network manager of the local subsystem and saved in a link database. The cross-coupled link is considered operational responsive to the local subsystem completing a link training sequence, the link training sequence further including an exchange of identities between the local subsystem and the remote subsystem according to an embodiment. The global broadcast tree is built partly by a central network manager of the local subsystem and partly by a central network manager of the remote subsystem according to another embodiment. According to another embodiment the building of the global broadcast tree further includes selecting a pair of glue routers on each storage entity to find a branch between the local subsystem and the remote subsystem and designating one glue router as a parent of the other glue router so that each cross-coupled link avoids being an up link in one tree and a down link in another tree in the same link direction.

Technical effects and benefits include providing reliable communication over cross-coupled links between independently managed compute and storage networks. Embodiments provide a method, system, and computer program product for setting up basic information about cross-coupled independently managed compute and storage network, for setting up and managing a global broadcast tree, for handling conditions causing inconsistent link state across cross-couple links, and for handling problems with a multicast service engine on the I/O router.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for providing communication over cross-coupled links between independently managed compute and storage networks, comprising:
    coupling, by a processing device, an independently managed local subsystem with an independently managed remote subsystem over cross-coupled links, each subsystem comprising compute entities and storage entities;
    assigning unique identifiers to the compute entities and the storage entities in a local network and a remote network;
    determining whether each entity is in the local subsystem or the remote subsystem;
    building a global broadcast tree bridging the compute entities in the local subsystem to the storage entities in both the local and remote subsystem, the building based on the assigning and the determining; and
    responsive to an error in a layer of the local subsystem external to a cross-coupled link, disabling the cross-coupled link in the local subsystem, wherein the remote subsystem will detect the link has failed.

2. The computer-implemented method of claim 1, wherein the assigning of the unique identifiers further comprises varying a number of storage entities that can be supported based on a configuration of the compute entities.

3. The computer-implemented method of claim 1, wherein the cross-coupled link is marked as a one-sided link by a central network manager of the local subsystem and saved in a link database.

4. The computer-implemented method of claim 1, wherein the cross-coupled link is considered operational responsive to the local subsystem completing a link training sequence, the link training sequence further comprising an exchange of identities between the local subsystem and the remote subsystem.

5. The computer-implemented method of claim 1, wherein the global broadcast tree is built partly by a central network manager of the local subsystem and partly by a central network manager of the remote subsystem.

6. The computer-implemented method of claim 1, wherein the building of the global broadcast tree further comprises:
    selecting a pair of glue routers on each storage entity to find a branch between the local subsystem and the remote subsystem; and
    designating one glue router as a parent of the other glue router so that each cross-coupled link avoids being an up link in one tree and a down link in another tree in the same link direction.

7. A computer system for providing communication over cross-coupled links between independently managed compute and storage networks, the system comprising:

a memory and a processor, the system configured to perform a method comprising:

coupling an independently managed local subsystem with an independently managed remote subsystem over cross-coupled links, each subsystem comprising compute entities and storage entities;

assigning unique identifiers to the compute entities and the storage entities in a local network and a remote network;

determining whether each entity is in the local subsystem or the remote subsystem;

building a global broadcast tree bridging the compute entities in the local subsystem to the storage entities in both the local and remote subsystem, the building based on the assigning and the determining; and responsive to an error in a layer of the local subsystem external to a cross-coupled link, disabling the cross-coupled link in the local subsystem, wherein the remote subsystem will detect the link has failed.

8. The computer system of claim 7, wherein the assigning of the unique identifiers further comprises varying a number of storage entities that can be supported based on a configuration of the compute entities.

9. The computer system of claim 7, wherein the cross-coupled link is marked as a one-sided link by a central network manager of the local subsystem and saved in a link database.

10. The computer system of claim 7, wherein the cross-coupled link is considered operational responsive to the local subsystem completing a link training sequence, the link training sequence further comprising an exchange of identities between the local subsystem and the remote subsystem.

11. The computer system of claim 7, wherein the global broadcast tree is built partly by a central network manager of the local subsystem and partly by a central network manager of the remote subsystem.

12. The computer system of claim 7, wherein the building of the global broadcast tree further comprises:

selecting a pair of glue routers on each storage entity to find a branch between the local subsystem and the remote subsystem; and designating one glue router as a parent of the other glue router so that each cross-coupled link avoids being an up link in one tree and a down link in another tree in the same link direction.

13. A computer program product for implementing communication over cross-coupled links between independently managed compute and storage networks, the computer program product comprising:

a non-transitory computer readable storage medium readable by a processing circuit and storing instructions for execution by the processing circuit for performing a method comprising:

coupling an independently managed local subsystem with an independently managed remote subsystem over cross-coupled links, each subsystem comprising compute entities and storage entities;

assigning unique identifiers to the compute entities and the storage entities in a local network and a remote network;

determining whether each entity is in the local subsystem or the remote subsystem;

building a global broadcast tree bridging the compute entities in the local subsystem to the storage entities in both the local and remote subsystem, the building based on the assigning and the determining; and responsive to an error in a layer of the local subsystem external to a cross-coupled link, disabling the cross-coupled link in the local subsystem, wherein the remote subsystem will detect the link has failed.

14. The computer program product of claim 13, wherein the assigning of the unique identifiers further comprises varying a number of storage entities that can be supported based on a configuration of the compute entities.

15. The computer program product of claim 13, wherein the cross-coupled link is marked as a one-sided link by a central network manager of the local subsystem and saved in a link database.

16. The computer program product of claim 13, wherein the cross-coupled link is considered operational responsive to the local subsystem completing a link training sequence, the link training sequence further comprising an exchange of identities between the local subsystem and the remote subsystem.

17. The computer program product of claim 13, wherein the global broadcast tree is built partly by a central network manager of the local subsystem and partly by a central network manager of the remote subsystem.

18. The computer program product of claim 13, wherein the building of the global broadcast tree further comprises:

selecting a pair of glue routers on each storage entity to find a branch between the local subsystem and the remote subsystem; and designating one glue router as a parent of the other glue router so that each cross-coupled link avoids being an up link in one tree and a down link in another tree in the same link direction.

* * * * *